Jan. 23, 1934. W. F. BARNES 1,944,833
SUPPORT
Filed Oct. 17, 1932  3 Sheets-Sheet 1
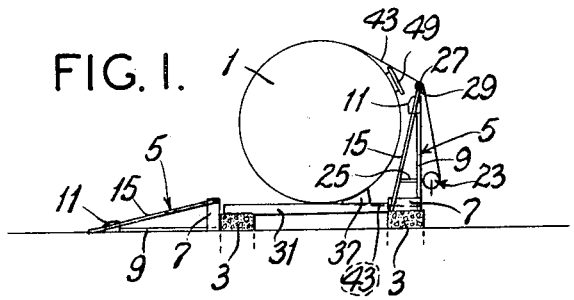
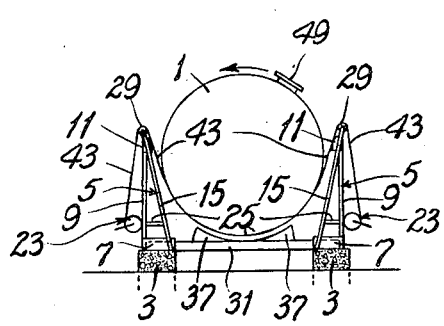
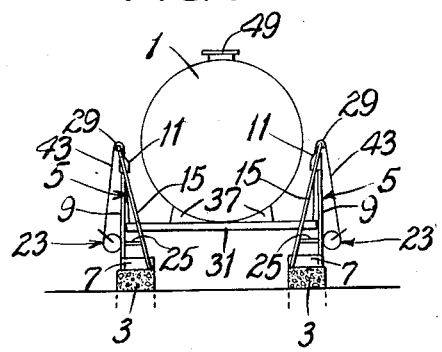
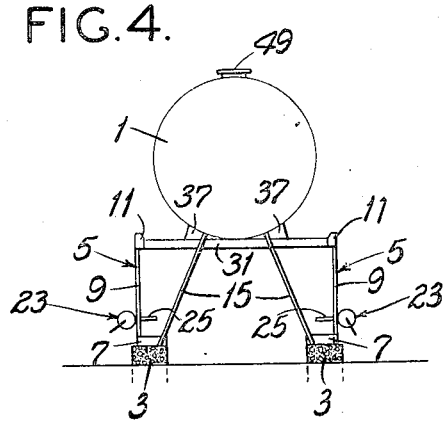
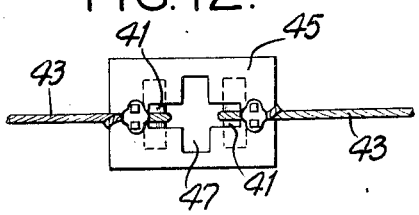
Inventor,
William F. Barnes.
Delos G. Haynes,
Attorney.

Jan. 23, 1934.     W. F. BARNES     1,944,833
SUPPORT
Filed Oct. 17, 1932     3 Sheets-Sheet 2
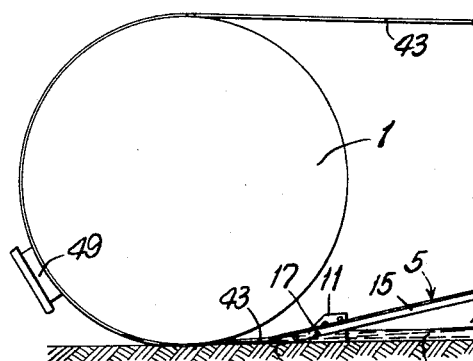
FIG. 5.
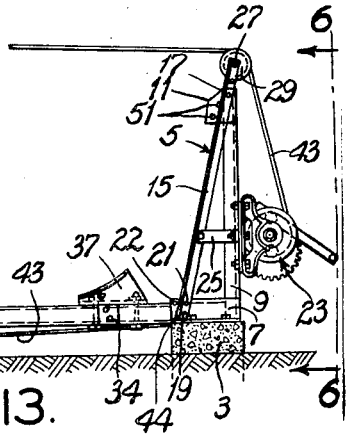
FIG. 6.
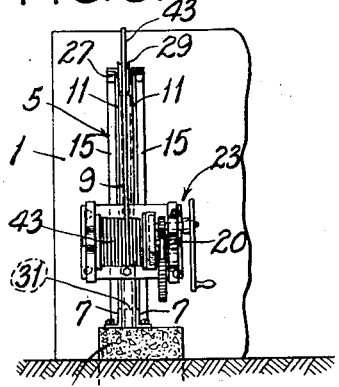
FIG. 13.
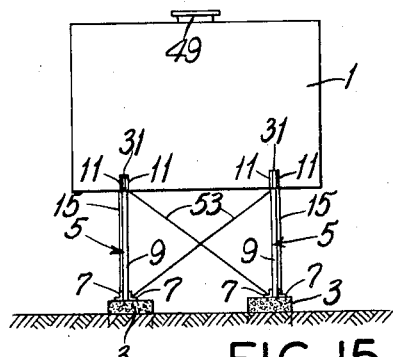
FIG. 14.     FIG. 15.
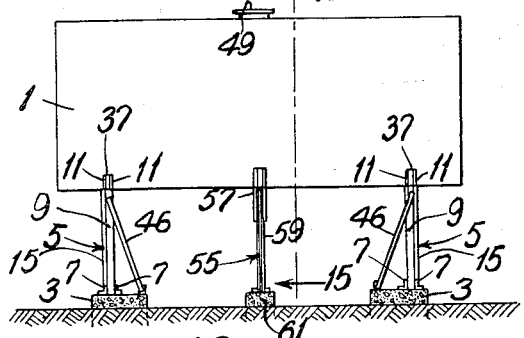
FIG. 16.
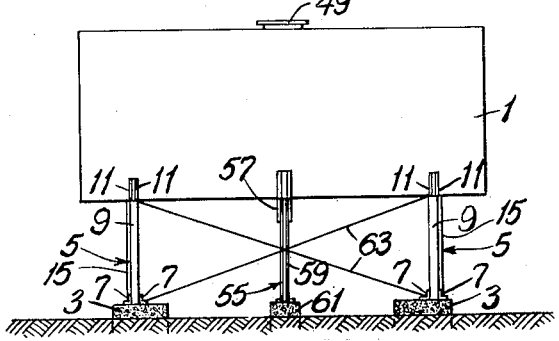
Inventor,
William F. Barnes
Delos G. Haynes,
Attorney Jan. 23, 1934.　　　　W. F. BARNES　　　　1,944,833
SUPPORT
Filed Oct. 17, 1932　　　3 Sheets-Sheet 3
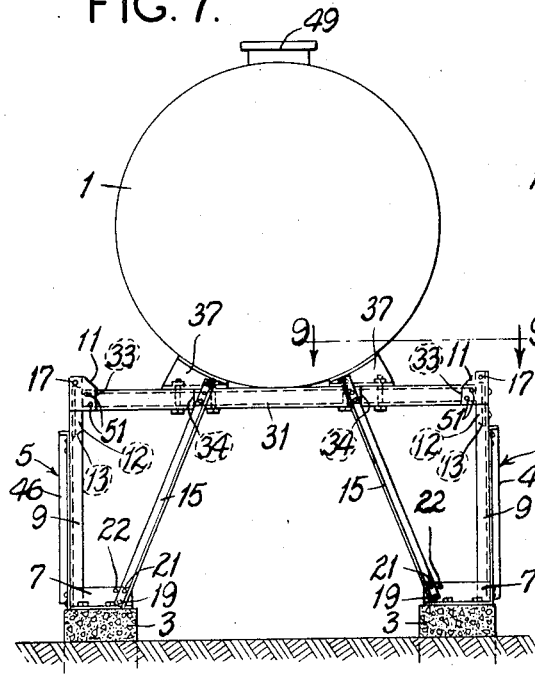
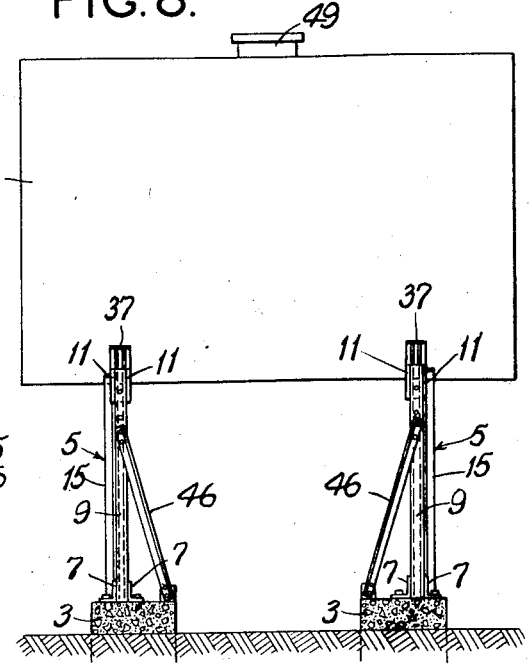
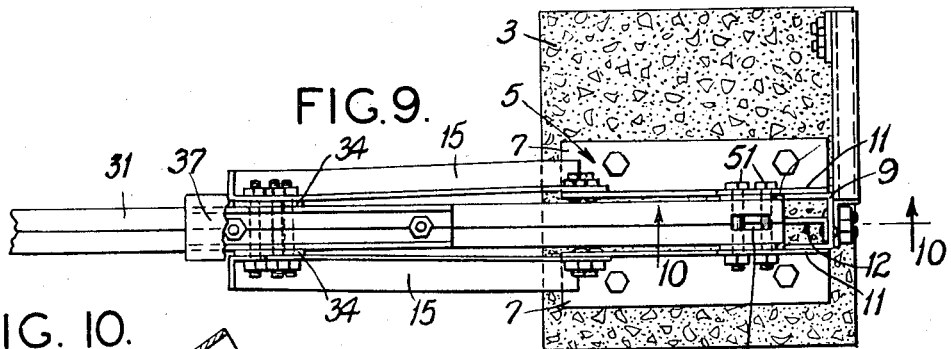
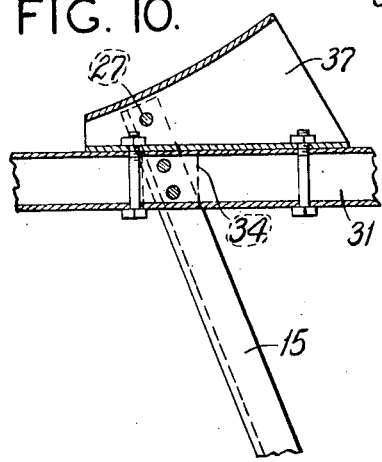
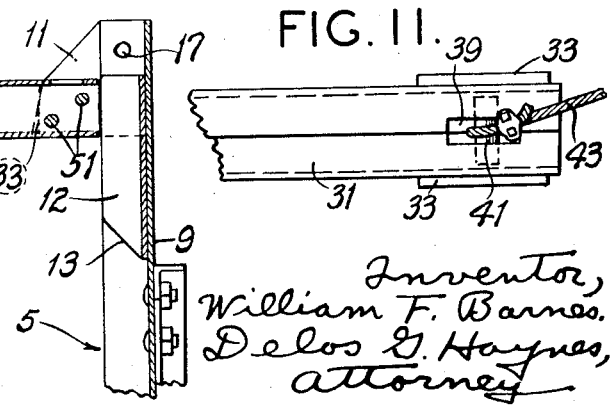

Patented Jan. 23, 1934

1,944,833

UNITED STATES PATENT OFFICE 1,944,833

SUPPORT

William F. Barnes, East St. Louis, Ill., assignor to St. Louis Structural Steel Co., East St. Louis, Ill., a corporation of Delaware Application October 17, 1932. Serial No. 638,087

8 Claims. (Cl. 214—152)

This invention relates to supports, and with regard to certain more specific features, to supports for tanks and the like.

Among the several objects of the invention may be noted the provision of a steel supporting structure which includes inherent facilities for lifting into position that which is to be supported, such as a steel tank; the provision of a structure of the class described which greatly reduces the time required for erection, simplifies the procedure thereof, and increases safety; the provision of a device of the class described which reduces the labor cost of erection and the number of men and time required to accomplish the same; the provision of a device of this class which permits of ready dismantling and removal of tanks and their supporting structures; and the provision of a simple form of structure using readily procurable elements. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a diagrammatic end elevation showing the completion of a first step in erection procedure;

Fig. 2 is a view similar to Fig. 1 showing a second adjusting step;

Fig. 3 is a view similar to Fig. 1 showing a third lifting step;

Fig. 4 is a view similar to Fig. 1 showing an elevated position of a tank as finally braced;

Fig. 5 is a more detailed end elevation showing a preliminary arrangement of elements;

Fig. 6 is a detailed side elevation taken along line 6—6 of Fig. 5;

Fig. 7 is an end elevation corresponding to Fig. 4 showing details and certain winches removed;

Fig. 8 is a side elevation of Fig. 7;

Fig. 9 is a fragmentary horizontal section taken on line 9—9 of Fig. 7;

Fig. 10 is a vertical section taken on line 10—10 of Fig. 9;

Fig. 11 shows a cable fastening detail for lifting purposes;

Fig. 12 shows a cable fastening detail for tank adjusting purposes;

Fig. 13 is a view similar to Fig. 8 showing an alternative bracing structure;

Fig. 14 is a view similar to Fig. 8 showing an auxiliary central brace for long tanks;

Fig. 15 is a cross section taken on line 15—15 of Fig. 14; and,

Fig. 16 is a view similar to Fig. 14 showing an alternative bracing structure.

Similar reference characters indicate corresponding parts throughout the several views of the drawings.

Heretofore, supporting structures for tanks and the like have been rigidly built up and then, with substantial labor, tanks or whatever is to be supported have been elevated into position on said structure; or, in the alternative the tanks or the like such as boilers were elevated into position and the structures permanently built about them. In either case separate lifting equipment was used for elevating the tank. Hereinafter the term "tank" will be used as exemplifying that which is to be supported.

The present invention comprises a knocked-down structure which during erection may be used as lifting equipment and thereafter converted into true supporting and bracing equipment.

Referring more particularly to Figs. 1 and 5, there is shown at numeral 1 a tank which it is desired to support and which therefore needs initially to be properly located and subsequently elevated and which requires a permanent supporting structure. At numeral 3 is shown a suitable concrete sub-structure upon which the structure of the invention is to be placed.

The structure per se comprises a series of plural legged or "A" frames 5 adapted by means of bolted base plates 7 to be held to the foundation blocks 3. As shown in Figs. 7, 8 and 9 the base plates 7 are shown as being in the shape of angle irons holding therebetween in the case of each "A" frame an inwardly open, vertical, channel shaped leg 9 (Fig. 9).

Exteriorly and at its upper end, each channel shaped leg 9 has welded thereto oppositely disposed and parallel gusset plates 11 and interiorly located at said upper end and attached thereto is a registering cam 12 having a sloping lower edge 13, the purpose of which will be described in proper order.

Each "A" frame also has a sloping leg 15 (each leg comprising two outwardly directed angle irons) which leg 15 is temporarily folded into the position shown in Figs. 1—3 and 5, the upper end being held by means of a bolt at 17 and the lower end by means of bolts at 19 and 21. The oppositely disposed angle members of the legs 15, for guiding purposes, correspond with the opposite flanges of the channel brace 9, as will also appear.

Two "A" frames of the above description are permanently attached to a pair of foundation blocks 3, (or as many of the "A" frames and blocks 3 as are to be used on one side of the tank). It will be understood that in Figs. 1 and 5 the erected "A" frame which is shown is a direct line with the one behind it.

Each of the "A" frames erected is temporarily provided with a ratchet winch 23, the winch being held to the channel 9 by means of suitable bolts and the brace 25 reaching to the leg 15 (see Figs. 5 and 6). A pulley 29 is also placed at the end of each leg 15. This is done by passing a bolt 27 through holes in the angle irons forming the legs 15 and placing the pulley thereon between said angle irons. Thus there is temporarily provided one pulley on the upper end of each erected "A" frame.

Corresponding "A" frames which might be positioned at this time on the opposite foundation blocks are not erected. They are, however, assembled with their base plates 7 as above described, and laid into reclining position as shown in Figs. 1 and 5 and, in this position are in the respective planes of the erected "A" frame. They are also preferably within the planes of the tank heads so that a tank may be rolled up the reclining "A" frames, the frames thus being useful as inclined planes for positioning purposes. It is to be understood, however, that where necessary a tank may be moved between the reclined, or otherwise positioned frames, or passed over them where such is more convenient.

In order to receive the tank, after it has passed or traversed the inclined plane comprising the reclining "A" frames, I provide cross lifting and supporting beams 31 which also lie in the planes of the pairs of erected and reclining "A" frames and thus serve as numbers upon which the tank 1 may roll. These lifting beams 31 slidably fit between the oppositely spaced members of the legs 15 of the "A" frames when the latter are erected. The length of the cross beams 31 are such that they may easily be raised, the same extending slightly into and running between the oppositely disposed flanges of the channel members 9.

It will be noted that each cross beam 31 is provided with the endwise spotting plates 33 and mid spotting plates 34. The plates near the ends of the beam are placed a small distance from the exact ends of the beams for the purpose of permitting said ends of the beams 31 to ride within the channel sections 9, and thus be loosely guided in upward travel. Some guiding is also effected by said oppositely disposed angle members of the legs 15.

As will be shown, it is desired to finally bolt the cross beams 31 into position between the gusset plates 11 at the upper ends of opposite vertical legs 9. In order to accomplish this the holes in the respective members should be properly aligned and for this purpose the cam 12 is used. The cam 12 is engaged by the rising cross beams 31 so as to properly laterally position the cross beams.

Each cross beam 31 when in the lower position shown in Figs. 1 and 5 is provided with one of a pair of saddle-shaped cradle members 37 which are at this time affixed to the cross beams.

Each cross beam 31 is also provided near the ends thereof with openings 39 adapted to each receive a pin 41 in one position, said pin 41 being short enough so that it may be turned through ninety degrees within the cross beam 31 so as to take a holding position. A cable 43 from an adjacent winch 23 and passing over a respective pulley 27 is attached to each pin 41. Thus the winches are adapted to lift the lifting beams.

A belly plate 45 having a cruciform opening 47 therein for lockingly receiving a pair of said pins 41 is used for adjusting purposes to be described in turn (Fig. 12).

The operation of erection is as follows, referring to Figs. 1 to 4, and 5 and 8:

A pair of the "A" frames 5 are set up on a pair of the foundation blocks 3 (see Fig. 8 for a side elevation). A pair of cross beams 31 are located in the planes of the erected "A" frames 5. Also, a pair of reclining "A" frames 5 are respectively arranged in the planes of said erected "A" frames and the lifting beams. Cables 43 from the winches 23 are caused to pass over pulleys 29 and around the drum 1 and back to suitable fastenings 44 on the erected "A" frames 5. This is a relatively simple operation, inasmuch as the tank 1 may be rolled upon the ground with little effort and the cables drawn under the same.

Next the winches 23 on the erected "A" frames 5 are operated so as to take up cable, whereupon the tank rolls toward and up the reclining "A" frames 5 and on to the cross beams 31 (Figs. 5 and 1). The rolling of the tank 1 is finally stopped by the then positioned cradle members 37 (Fig. 1).

Next, the tank is blocked up on the cross beams 31 by means of oppositely disposed cradle members 37 which are at this time affixed to the cross beams (Fig. 2). Then the reclining "A" frames are lifted into position on their respective foundation blocks 3 and bolted down. They take up a position with respect to the cross beams 31 corresponding to the positions of the then erected "A" frames 5 at the other ends and also function as guides for the subsequent upward motion of said lifting beams.

Winches are applied to the newly erected "A" frame and also pulleys 29. All of the "A" frames are at this time caused to be held by side braces 46 extending to the respective foundation block. It will be understood that the braces 46 of the originally erected two "A" frames may have been previously placed in position.

Next, the cables 43 are loosened from their fastenings with the erected "A" frames 5, and after having applied a corresponding set of cables 43 to the newly erected "A" frames 5, said cables are arranged as belly bands under the tank 1, oppositely disposed cable 43 being fastened as shown in Fig. 12. Then by manipulating the winches 23, the tank may be lifted clear of the cradles 37 (Fig. 2) and rotated into proper position by means of said cables 43. Thus the same cables that were used to roll the tank into position are used to adjust it so that any manholes 49 or the like may be properly angularly located. After the manhole or other protuberance is properly positioned, the winches 23 are operated to lower the tank 1 into position on the cradle member 37. Manually releasable pawls 20 on the winches facilitate holding and adjusting of the tanks.

The next operation is the unfastening of the cables 43 from the plate 45 (Fig. 12) and the fastening of said cables into the ends of the lifting means 31 (Fig. 11). After this latter fastening, all of the winches 23 may be operated at one time; or if only two men are available, pairs of winches at opposite ends of the tank may be operated to lift each end of the tank a short distance at a time. It is even possible for even one man to perform the operation by effecting a small part of the lift by means of each winch successively. Thus the tank is lifted on the lifting means 31 (Fig. 3).

As the lifting means 31 are elevated, they are guided because they are between the oppositely disposed angle irons of the legs 15 and have a slight extension into the vertical channels 9. This is a loose guide in order to avoid binding. As the lifting beams 31 come into final position, their ends engage said cams 12 so that the holes in the ends of the beams are properly aligned with the respective holes in the gusset plates 11. Finally, bolts 51 are put into position to hold the beams to the upper ends of the channel legs 9 (Fig. 10). It will be noted, however, that the holding is effected directly on the vertical legs 9 by means of the plates 11 and not to the slanting legs 15.

The next step comprises removal of the pulleys 29 from between the adjacent extensions of the angle irons of the legs 15. The cables 43 may be removed at this time, as well as the winches 23, although if desired the winches may be later removed.

After removal of the pulleys 29, each "A" frame 5 is successively broken down. This is done by unfastening the brace 25 which previously aided in holding the winches 23, and removing of the bolts at 17 which held the legs 15 to the vertical legs 9. Then by removing the bolts 21 of the pair at the lower ends of the legs 15, the angle iron members of said legs 15 may be swung about the lower bolts 19 to assume the position shown in Figs. 4 and 7, wherein the upper ends of the legs 15 are bolted to the inwardly located spotting plates 34. Three bolts are supplied through the legs 15, the lifting beams 31 and cradles 37. Another bolt takes the place of the previously removed bolt 21, this being done by means of a second hole 22 which was previously provided in the plate 7. Thus it will be seen that the "A" braces are broken down one-by-one to be converted from triangular figures into quadrilateral figures in which the legs 15 function as struts.

It will be noted that the subsequent positions of the legs 15 as compression braces beneath the tank also results in the lifting beams 31 being supported at two mid-points. Because of this added support, the beam section may be made smaller than otherwise such as by using the two small, abutted channel sections shown in Figs. 9 and 10. It will be understood that while the tank is being lifted, it is empty and that a relatively small unbraced beam section will suffice, but after the tank has been lifted it is filled and it is at this time that an amply braced beam is required, but one which it is desirable to have as economically constructed as is possible, as in the case with this invention.

A side elevation of a two-support structure is shown in Fig. 8. It will be understood that the braces 46 may have equivalents substituted therefor, such as the tie rods 53 shown in Fig. 13.

For a longer tank, the number of pairs of oppositely disposed pairs of "A" frames may be indefinitely multiplied; or, as shown in Figs. 14 and 15, there may be used a central compression support 55, comprising a saddle 57 held in position by a double channel compression column 59 supported on a foundation block 61. The central position of the support 59 is further illustrated in Fig. 15.

It will also be understood that the modified form of Figs. 14 and 15 may have tie rods 63 substituted for the braces 47.

If it be ever desired to dismantle a tank structure and take down the tank, the methods above described may be reversed with obviously no difficulty.

From the above it will be seen that the structural elements of the supports are also employed for locating the tank, orienting it, aiding in lifting it and for permanently supporting it. The "A" shapes of the members by the strength of which lifting is done are useful in effecting an incline up which the tanks may be rolled. They also effectively clear the tanks while it is in its lower position on the lifting beams (Fig. 2), and they may be broken to position such that portions thereof come under the tank for permanent support. The breaking of the "A" frames, may be effected one-by-one in order that the supporting effect of a plurality of other "A" frames may be had while the one is being broken.

The advantages of the invention include the following:

A very few number of easily fabricated parts serve a multiplicity of functions, thus permitting of an economical but at the same time a rugged construction. The speed of erection is increased because a large amount of auxiliary equipment is eliminated.

As to the winches 23 and pulleys 27, it will be understood that they may be used successively on different structures and the four winches, four pulleys and cable with attachment are the only auxiliary equipment required to erect many structures.

The erection ordinarily requires only two men, and it is possible that one man could carry it out. If more than two men are desired for faster work, the procedure of erection is such that they can all be busy at substantially all times, thus preventing idleness.

Complete safety of the workmen is assured, because at no time are they required to get directly under or upon the structure.

It is to be understood that a structure corresponding to the one described herein may be used individually for elevating and supporting one tank; or it may be used as an adjunct to permanent adjacent structures for lifting a number of tanks thereon, the lifting structure being finally used as a permanent support for the last device lifted. Analogous uses may be thought of and it is intended that they come within the scope of the claims herein.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A method of erecting tanks comprising erecting a plurality of frames, applying cable winches thereto, encircling the tank with the cables of the winches, placing lifting beams upon which the tank is adapted to be drawn by said cable winches, cradling the tank on the lifting beams, erecting added frames on the side of the tank opposite said first-named frames, orienting the tank by means of said cable winches and subsequently lifting the tank by means of said cable winches.

2. A method of erecting tanks comprising erecting a plurality of frames and oppositely disposing similar but reclining frames, the frames having temporary cable winches thereon, encircling the tank with the cables of the winches, placing lifting beams upon which the tank is adapted to be drawn by said cable winches, the tank being drawn up on the reclining frames, cradling the tank on the lifting beams, orienting the tank by means of said cable winches, and subsequently lifting the tank by means of said cable winches fastened to the lifting beams.

3. A method of erecting tanks comprising erecting a frame, applying a cable winch thereto, applying to a tank the cable of the winch, placing a lifting beam upon which the tank is drawn by said cable winch, erecting an added frame on the other side of the tank, said added frame having another winch, and subsequently lifting the tank by attaching the cables to the lifting beam and operating the winches.

4. A method of erecting tanks comprising erecting a frame, applying at least one cable winch thereto, applying to a tank the cable of the winch, placing a lifting beam upon which the tank is drawn by said cable winch, erecting an added frame on the other side of the tank, said added frame having another winch, subsequently lifting the tank by attaching the cables to the lifting beam and operating the winches, thereafter moving portions of said frames to form mid-braces for said beam, and fastening the beam to the moved and unmoved portions of the frames.

5. A method of erecting tanks comprising erecting a plurality of plural legged frames, applying cable winches thereto, applying to a tank the cables of the winches, placing lifting beams upon which the tank is drawn by said cable winches, erecting added plural legged frames on the side of the tank opposite said first-named frames and having other winches, subsequently lifting the tank by attaching the cables to the lifting beams and operating the winches, thereafter opening the frames by separating their legs at the top, the inner legs being moved to be fastened to and to form mid-braces for said beams, and fastening the end portions of the beams to the other legs respectively.

6. A method of erecting tanks comprising erecting a plurality of "A" frames, applying cable winches thereto, applying to a tank the cables of the winches, placing lifting beams upon which the tank is drawn by said cable winches, erecting added "A" frames on the side of the tank opposite said first-named "A" frames and having other winches, subsequently lifting the tank by attaching the cables to the beams and operating the winches, and thereafter opening the "A" frames by separating them at the apexes, the inner legs being moved to form mid-braces for said beams and fastening the end portions of the beams to the other legs respectively.

7. A method of erecting tanks comprising erecting a plurality of "A" frames, applying cable winches thereto and cable pulleys at the apexes, encircling a tank with the cables of the winches, said cables passing over said pulleys, placing lifting beams upon which the tank is drawn by said cable winches, erecting correspondingly equipped "A" frames on the side of the tank opposite said first-named "A" frames, subsequently lifting the tank by attaching the cables to the lifting beams after passing the cables over the respective pulleys and operating the winches, thereafter opening the "A" frames by removing said pulleys and separating them at the apexes, the inner legs being moved to form braces for said beams and fastening the end portions of the beams to the other legs respectively.

8. A method of erecting tanks comprising erecting a plurality of "A" frames temporarily pinned and provided with pulleys at their apexes, applying cable winches to the frames, encircling a tank with the cables of the winches after passing respectively over said pulleys, placing lifting beams upon which the tank is drawn by said cable winches, adjusting the tank on the beams by means of said cable winches, erecting correspondingly equipped "A" frames on the side of the tank, subsequently lifting the tank by attaching the cables to the lifting beams after passage respectively over said pulleys, operating the winches, thereafter removing said pulleys and unpinning the frames at said apexes and moving the inner legs of said frames to form mid-braces for said beams, fastening the end portions of the beams to the other legs respectively, and finally removing the winches.

WILLIAM F. BARNES.